United States Patent
Longo et al.

[11] Patent Number: 5,988,734
[45] Date of Patent: Nov. 23, 1999

[54] PASSENGER VEHICLE STRUCTURE

[75] Inventors: Stephen D. Longo, Bloomfield Hills; Edward D. Moss, Walled Lake; Brian William Deutschel, Sterling Heights; Richard E. MacCleery, Birmingham; Roger Earl Johnson, Shelby Township; Michael J. McCann, Roseville, all of Mich.

[73] Assignee: General Motors Corporation, Detroit, Mich.

[21] Appl. No.: 09/026,849

[22] Filed: Feb. 20, 1998

[51] Int. Cl.⁶ .......................................................... B60J 7/00
[52] U.S. Cl. ..................... 296/203.01; 296/204; 296/186; 296/205; 280/781; 280/797; 280/798
[58] Field of Search ............................... 296/204, 203.01, 296/186, 205; 280/781, 797, 798

[56] References Cited

U.S. PATENT DOCUMENTS

| | | | |
|---|---|---|---|
| 2,292,646 | 8/1942 | McIntosh et al. | 280/797 |
| 3,108,836 | 10/1963 | Deckert | 296/204 |
| 3,366,411 | 1/1968 | Vittone | 280/781 |
| 4,081,197 | 3/1978 | Ackel | 296/204 |
| 4,129,330 | 12/1978 | Schwuchow | 296/204 |
| 4,514,008 | 4/1985 | Watanabe et al. | 296/204 |
| 4,971,357 | 11/1990 | Nagasaki et al. | 280/801 |
| 5,174,628 | 12/1992 | Hayatsugu et al. | 296/204 |
| 5,527,081 | 6/1996 | Rausch et al. | 296/186 |
| 5,788,322 | 8/1998 | Wolf et al. | 296/204 |

*Primary Examiner*—Joseph D. Pape
*Assistant Examiner*—Kiran Patel
*Attorney, Agent, or Firm*—Charles E. Leahy

[57] ABSTRACT

A vehicle body structure includes a perimeter frame including laterally spaced right and left side rails of tubular construction and front and rear bumper rails of tubular construction extending between the side rails. A structural tunnel extends longitudinally of the vehicle midway between the side rails and has front and rear ends. The structural tunnel includes an inverted U-shaped channel having vertically depending the first and second legs, and a close-out plate which extends horizontally between the legs. First and second front shear walls extend forwardly and diagonally from the first and second legs at the front of the tunnel to the respective right and left side rails of the perimeter frame. Similarly, first and second rear shear walls extend generally rearward and diagonally from the first and second legs at the rear end of the tunnel to the respective left and right side rails of the perimeter frame. Reinforcement plates are welded along side the front shear walls and the rear shear walls to additionally connect the legs of the structural tunnel with the right and left side rails. Right and left rear pillars are attached respectively to the right and left side rails of the perimeter frames, and right and left seat back shear walls extend laterally between the rear ends of the tunnel and the right and left pillars. The body structure is additionally stiffened by reinforcing brackets which extend between the front and rear shear walls and the perimeter frames.

8 Claims, 4 Drawing Sheets

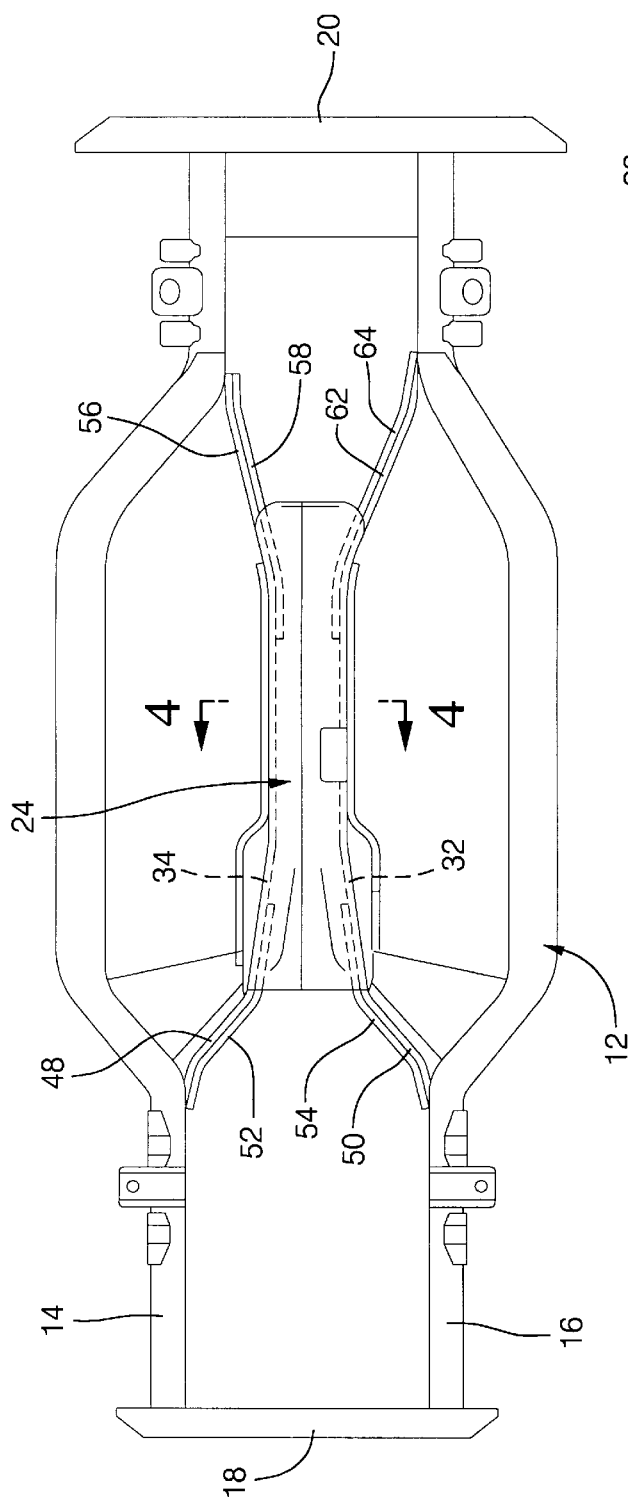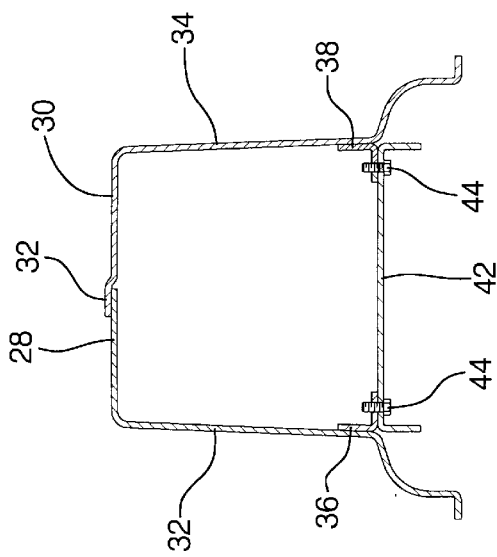
FIG. 3
FIG. 4

US 5,988,734

PASSENGER VEHICLE STRUCTURE

TECHNICAL FIELD

The invention relates to a passenger vehicle structure and more particularly provides a perimeter frame and closed section structural tunnel arrangement which cooperates to maximize the torsional stiffness of the motor vehicle.

BACKGROUND OF THE INVENTION

It is well known that motor vehicles are constructed of welded together structural components. In the design of such vehicle body structure it is desirable to provide high strength and stiffness while at the same time minimizing the weight of the vehicle body. The present invention provides a new and improved vehicle body structure which is particularly designed to maximize the torsional stiffness of the vehicle, minimize the weight of the vehicle, and is particularly suited to an open roof vehicle.

SUMMARY OF THE INVENTION

A vehicle body structure includes a perimeter frame including laterally spaced right and left side rails of tubular construction and front and rear bumper rails of tubular construction extending between the side rails. A structural tunnel extends longitudinally of the vehicle midway between the side rails and has front and rear ends. The structural tunnel includes an inverted U-shaped channel having vertically depending the first and second legs, and a close-out plate which extends horizontally between the legs. First and second front shear walls extend forwardly and diagonally from the first and second legs at the front of the tunnel to the respective right and left side rails of the perimeter frame. Similarly, first and second rear shear walls extend generally rearward and diagonally from the first and second legs at the rear end of the tunnel to the respective left and right side rails of the perimeter frame. Reinforcement plates are welded along side the front shear walls and the rear shear walls to additionally connect the legs of the structural tunnel with the right and left side rails. Right and left rear pillars are attached respectively to the right and left side rails of the perimeter frames, and right and left seat back shear walls extend laterally between the rear ends of the tunnel and the right and left pillars. The body structure is additionally stiffened by reinforcing brackets which extend between the front and rear shear walls and the perimeter frames.

BRIEF DESCRIPTION OF THE DRAWINGS

These and other objects, features and advantages of the invention will become apparent upon consideration of the Description of the Preferred Embodiment and appended drawings in which:

FIG. 3 is a plan view of the vehicle body structure of FIG. 2;

FIG. 4 is a section view taken in the direction of arrows 4—4 of FIG. 3;

DESCRIPTION OF THE PREFERRED EMBODIMENT

Figure 1:
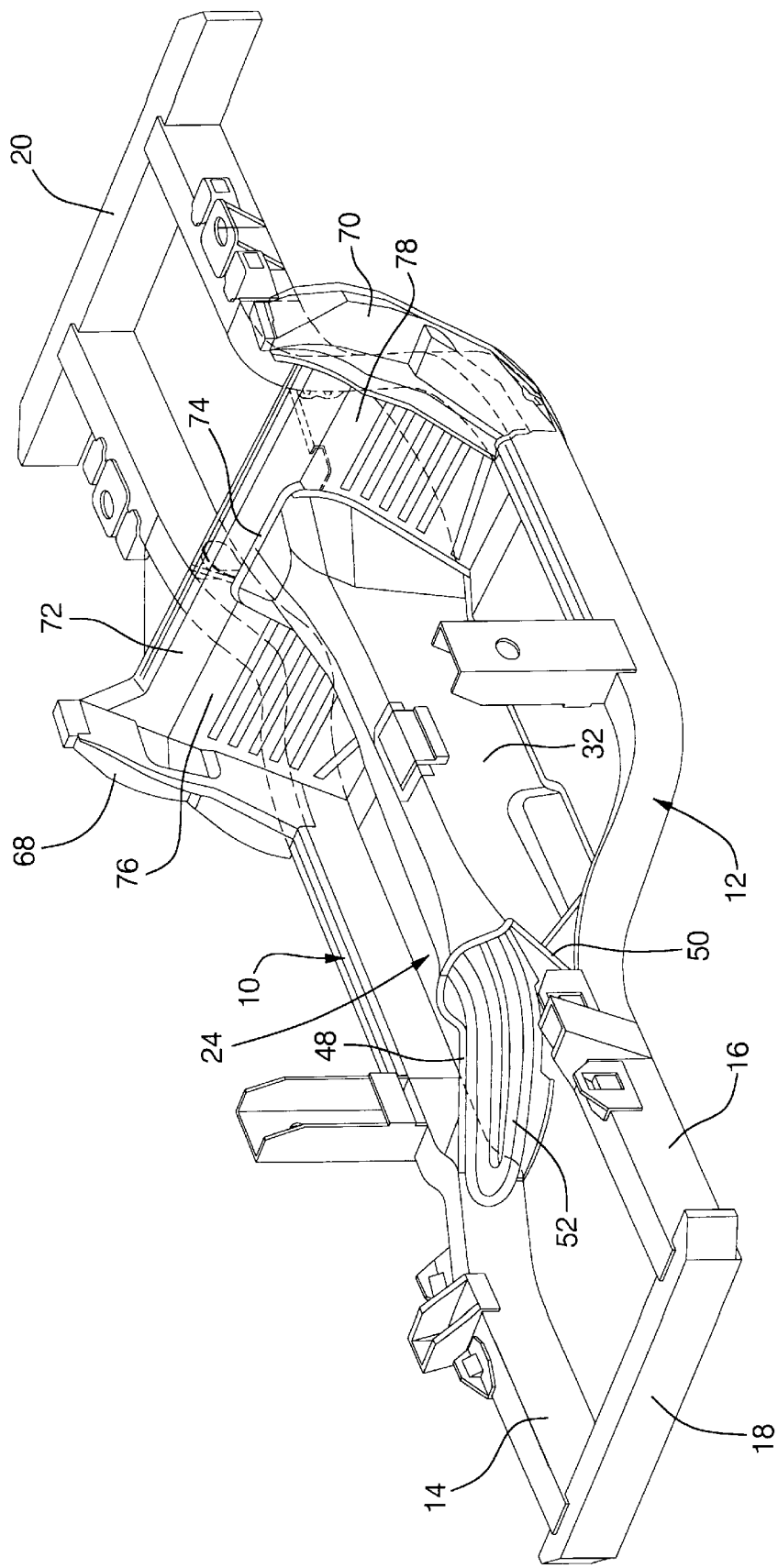
FIG. 1 is a perspective view of the vehicle structure of this invention.
Figure 2:
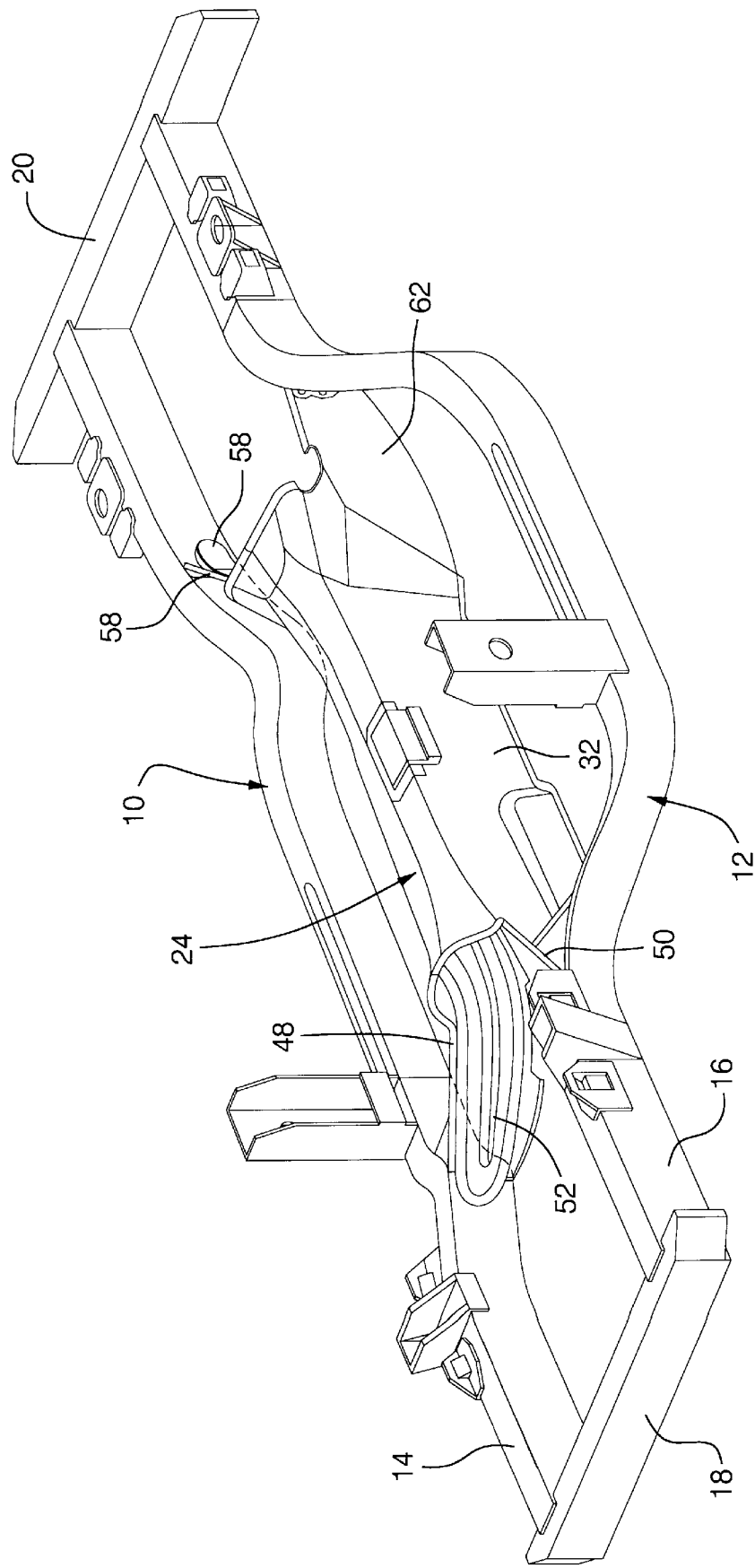
FIG. 2 is a view similar to FIG. 1 but showing portions of the vehicle structure removed for purposes of clarity.

The vehicle body structure 10 includes a perimeter frame 12 comprised of right side rail 14, left side rail 16, front bumper rail 18 and rear bumper rail 20. The side rails 14 and 16 extend the full length of the vehicle body and are preferably one piece hollow tubular members which are hydroformed to the desired shape. The front and rear bumper rails 18 and 20 are also of closed tubular shape and may be of welded or hydroformed construction. The bumper rails are welded to the side rails to provide the perimeter frame 12.

The vehicle structure 10 also includes a closed tunnel structure generally indicated at 24. As best seen in FIG. 4, the tunnel structure 24 is comprised of a left hand stamping 28 and a right hand stamping 30 which are welded together at overlap joint 32. The structural tunnel 24 includes a first vertical leg 32 and a second vertical leg 34. Angle brackets 36 and 38 are welded to the lower ends of the front and second legs 32 and 34. A close out panel 42 extends horizontally between the legs 32 and 34 and is attached to the angle brackets 36 and 38 by a plurality of bolts 44 so that the structural tunnel 24 becomes a torsionally rigid closed box. The vehicle drive shaft, not shown, which will extend between the vehicle engine and the rear axle is housed within the structural tunnel 24 and readily accessible by removal of the close out panel 42.

As best seen in FIG. 3, the structural tunnel 24 includes, at the front end thereof, a right front shear wall 48 which is integral with the leg 34 and extends diagonally forward to overlap onto and be welded with the right side rail 14. A left front shear wall 50 is integral with the leg 32 of tunnel 24 and extends diagonally forward to overlap and be welded with the left side rail 16. A reinforcement panel 52 of stamped construction overlies the right hand front shear wall 48 and is suitably welded thereto as well as being welded to the side rail 14 in order to reinforce the front shear wall 48. A similar reinforcement panel 54 is of stamped construction and overlies the left front shear wall 50 and is welded thereto.

The rear end of the tunnel structure 24 is similarly connected to the side rails by a right rear shear wall 56 internal with depending leg 34 and welded to the right side rail 14. A stamped reinforcing panel 58 overlies the right rear shear wall 56. A left rear shear wall 62 is integral with depending leg 32 of the structural tunnel 24, extends diagonally to the left side rail 16, and is welded to the left front rail 16. A stamped reinforcement panel 64 overlies the rear shear wall 62 and is welded thereto.

It will be understood and appreciated that the front and rear shear walls, together with the reinforcing panels, are effective to provide rigid structure connection between the structural tunnel and the side rails of the vehicle structure to thereby impart substantial torsional rigidity to the vehicle structure.

Referring now to FIG. 1, it is seen that the vehicle body also includes a right rear pillar 68 and a left rear pillar 70 which are welded respectively to the side rails 14 and 16 and extend vertically upright therefrom. Rear pillar crossmember 72 extends crosswise between the pillars 68 and 70 and has a lower lip 74 which is welded to the top rear of the structural tunnel 24. A right hand seat back shear wall 76 is welded in place between the right pillar 68, right frame rail 14, structural tunnel 24, and the cross member 72. Similarly, a left seat back shear wall 78 is welded in place between the left pillar 70, left frame rail 16, structural tunnel 24 and crossmember 72. It should be understood and appreciated that the presence of the seat back shear panels 76 and 78 will cooperate to add additional torsional rigidity to the vehicle body.

Figure 5:
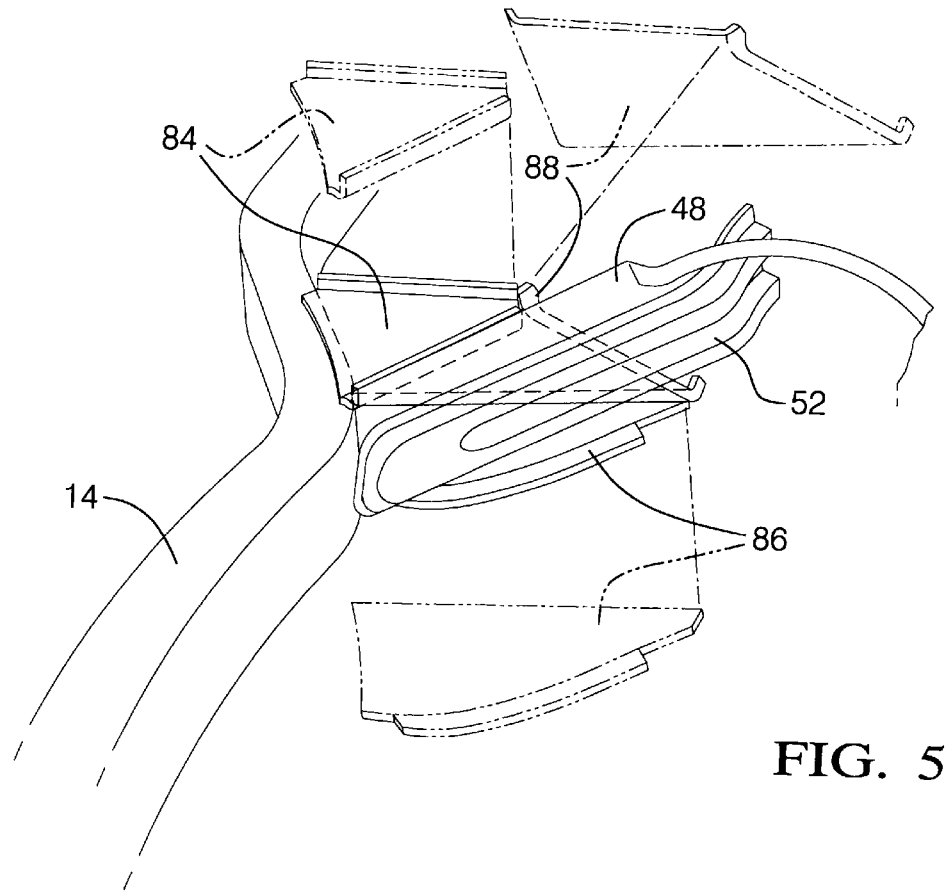
FIG. 5 is an exploded perspective view showing additional reinforcing brackets acting between front shear walls tunnel and the frame rail at the front end of the structural tunnel.

FIG. 5 shows the right front portion of the vehicle structure, particularly at the juncture between the right front shear wall 48 and reinforcement panel 52 with the right side rail 14. This connection of the shear wall 48 and reinforcement panel 52 to the side rail 14 is reinforced by adding welded-in-place reinforcement brackets including a top bracket 84, bottom bracket 86 and front bracket 88. Similar brackets are provided at the juncture between the left front shear wall 50, reinforcement panel 54 and left side rail 16.

Figure 6:
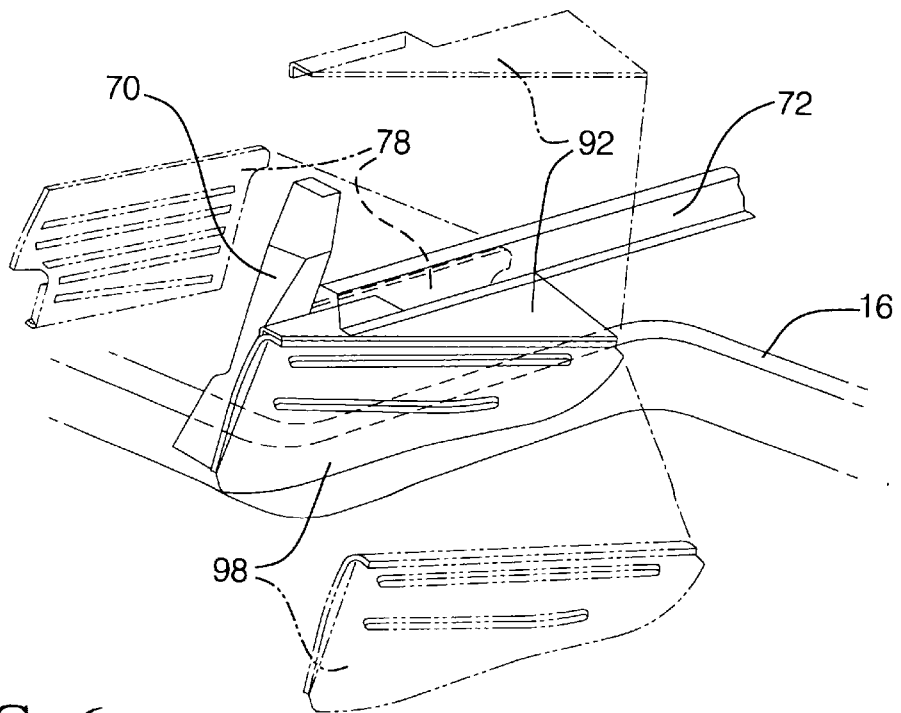
FIG. 6 is an exploded perspective view showing additional reinforcing brackets provided between the shear walls and frame rail at the rear end of the structural tunnel.

FIG. 6 shows the addition of reinforcement brackets to strengthen the connection of the seat back shear wall 78, pillar 70, and crossmember 72 with the left side rail 16. In particular, FIG. 6 shows the addition of welded-in-place top bracket 92 and rear reinforcement bracket 98.

It will be understood that the reinforcement brackets of FIGS. 5 and 6 stiffen and strengthen the attachment of the structural tunnel 24 to the side rails 14 and 16 and thereby add additional torsional rigidity to the vehicle structure.

Thus, it is seen that the invention provides an improved light weight, torsionally rigid vehicle body structure.

We claim:

1. A vehicle structure comprising;
    a perimeter frame including laterally spaced right and left side rails of tubular construction and front and rear bumper rails of tubular construction extending between the side rails;
    a structural tunnel extending longitudinally of the vehicle midway between the side rails and having front and rear ends, said structural tunnel including an inverted U-shaped channel having vertically depending first and second legs, and a close-out panel extending horizontally between the legs;
    first and second front shear walls extending generally diagonally respectively from the first and second legs at the frontmost end of the tunnel and attached to the respective left and right side rail of the perimeter frame;
    and first and second rear shear walls extending generally diagonally respectively from the first and second legs at the rearmost end of the tunnel and attached to the respective left and right side rail of the perimeter frame.

2. The vehicle body and frame structure of claim 1 further characterized by the shear walls of one of the front and rear shear walls being of integral one-piece construction with the first and second legs of the tunnel.

3. The vehicle body and frame structure of claim 1 further characterized by the shear walls of one of the front and rear shear walls being reinforced respectively by first and second reinforcement panels extending parallel with the first and second shear walls.

4. The vehicle body and frame structure of claim 1 further characterized by left and right floor braces extending laterally respectively between the first and second legs of the tunnel and the right and left side rails of the perimeter frame.

5. A vehicle structure comprising;
    a perimeter frame including laterally spaced right and left side rails of tubular construction and front and rear bumper rails of tubular construction extending between the side rails;
    a structural tunnel extending longitudinally of the vehicle midway between the side rails and having front and rear ends, said structural tunnel including an inverted U-shaped channel having vertically depending first and second legs, and a close-out panel extending horizontally between the legs;
    first and second front shear walls extending generally diagonally respectively from the first and second legs at the frontmost end of the tunnel and attached to the respective left and right side rail of the perimeter frame;
    first and second rear shear walls extending generally diagonally respectively from the first and second legs at the rearmost end of the tunnel and attached to the respective left and right side rail of the perimeter frame;
    right and left rear pillar uprights attached respectively to the right and left side rails of the perimeter frames;
    and right and left rear seat back shear walls extending laterally respectively between the rear end of the tunnel and the right and left pillar uprights.

6. The vehicle body and frame structure of claim 5 further characterized by the front and rear shear walls each being reinforced by respective reinforcement panels extending parallel with the shear walls and attached to the structural tunnel and the frame side rails.

7. The vehicle body structure of claim 5 further characterized by the attachment of the front and rear shear wall to the side rails of the perimeter frame being reinforced by reinforcement brackets attached to the shear walls and the side rails.

8. The vehicle body and frame structure of claim 5 further characterized by left and right floor braces extending laterally respectively between the first and second legs of the tunnel and the right and left side rails of the perimeter frame.

* * * * *